US011940752B2

(12) United States Patent
Kaneko

(10) Patent No.: US 11,940,752 B2
(45) Date of Patent: Mar. 26, 2024

(54) IMAGE FORMING APPARATUS WITH HOUSING INTEGRATION

(71) Applicant: FUJIFILM Business Innovation Corp., Tokyo (JP)

(72) Inventor: Atsushi Kaneko, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/951,110

(22) Filed: Sep. 23, 2022

(65) Prior Publication Data

US 2023/0305478 A1 Sep. 28, 2023

(30) Foreign Application Priority Data

Mar. 24, 2022 (JP) ................................ 2022-049099

(51) Int. Cl.
*G03G 15/00* (2006.01)

(52) U.S. Cl.
CPC .................................... *G03G 15/80* (2013.01)

(58) Field of Classification Search
CPC ...................................................... G03G 15/80
USPC ........................................................... 399/88
See application file for complete search history.

(56) References Cited

U.S. PATENT DOCUMENTS 9,910,406 B2 3/2018 Horii et al.
2013/0064567 A1* 3/2013 Akama ................ G03G 21/206 399/92

FOREIGN PATENT DOCUMENTS

JP 2013057913 3/2013
JP 2019152891 9/2019
JP 6950168 10/2021
KR 2014052522 A * 5/2014 ............ G03G 15/80

* cited by examiner

*Primary Examiner* — Quana Grainger
(74) *Attorney, Agent, or Firm* — JCIPRNET

(57) ABSTRACT

An image forming apparatus includes a housing; a powered body for image formation provided inside the housing; an attachable/detachable body that is attached to and detached from the housing; a power supply path body that is attached to and detached from the attachable/detachable body to form a power supply path; and a substrate that supplies power to the powered body, is directly mounted on the attachable/detachable body or the power supply path body, and is separated from the attachable/detachable body or the power supply path body.

20 Claims, 6 Drawing Sheets

IMAGE FORMING APPARATUS WITH HOUSING INTEGRATION

CROSS-REFERENCE TO RELATED APPLICATIONS

This application is based on and claims priority under 35 USC 119 from Japanese Patent Application No. 2022-049099 filed Mar. 24, 2022.

BACKGROUND

(i) Technical Field

The present invention relates to an image forming apparatus.

(ii) Related Art

An image forming apparatus described in JP6950168B has an image holding body for holding an electrostatic latent image, developing means for developing the electrostatic latent image of the image holding body, urging means for urging the developing means toward the image holding body, a holding member that holds the urging means and is disposed such that a portion of the urging means facing an urging direction comes into contact with an image forming apparatus main body directly or via another member, and a guide member that attachably and detachably guides the image holding body and the developing means to the image forming apparatus main body, in which the holding member is positioned along an attachment/detachment direction of the image holding body and the developing means with respect to the guide member and a direction orthogonal to both the attachment/detachment direction and the urging direction of the urging means, and is attached in a state of being allowed to move along the urging direction of the urging means, and the urging means urges the developing means through an insertion hole provided in the guide member.

SUMMARY

Aspects of non-limiting embodiments of the present disclosure relate to an image forming apparatus that downsizes a housing compared to a case where a power supply path body, a substrate, and an attachable/detachable body are attachably and detachably provided separately to the housing, respectively.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a housing; a powered body for image formation provided inside the housing; an attachable/detachable body that is attached to and detached from the housing; a power supply path body that is attached to and detached from the attachable/detachable body to form a power supply path; and a substrate that supplies power to the powered body, is directly mounted on the attachable/detachable body or the power supply path body, and is separated from the attachable/detachable body or the power supply path body.

BRIEF DESCRIPTION OF THE DRAWINGS

Exemplary embodiment(s) of the present invention will be described in detail based on the following figures, wherein.

DETAILED DESCRIPTION

Overall Configuration of Image Forming Apparatus

Figure 1:
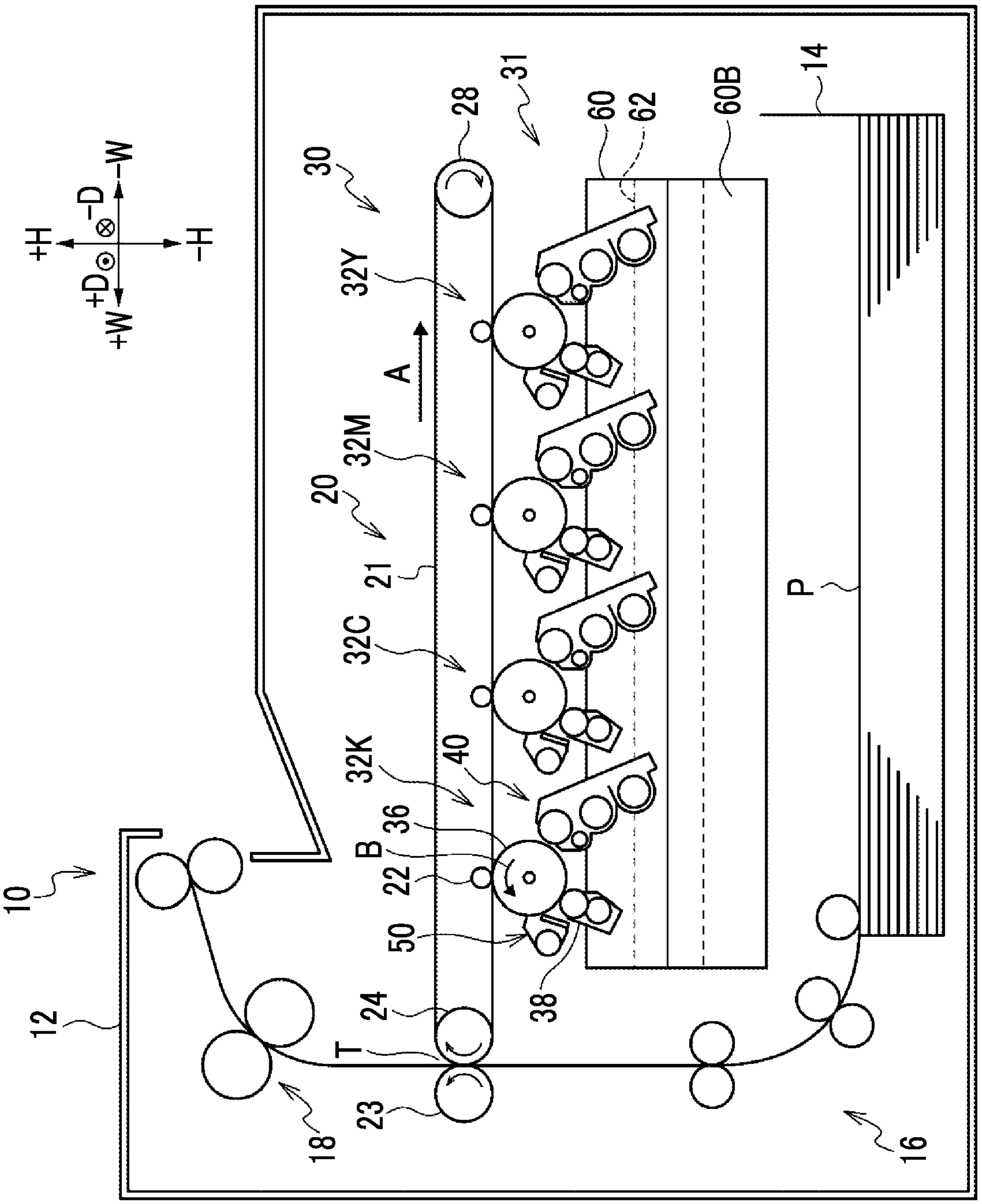
FIG. 1 is a layout diagram showing an overall configuration inside an image forming apparatus according to the present exemplary embodiment.

Hereinafter, the image forming apparatus 10 according to the present exemplary embodiment will be described with reference to FIGS. 1 to 6. First, as shown in FIG. 1, the image forming apparatus 10 according to the present exemplary embodiment includes an accommodating portion 14 in which a sheet material P as a recording medium is accommodated, and a transport unit 16 that transports the sheet material P accommodated in the accommodating portion 14.

Further, the image forming apparatus 10 includes an image formation unit 30 that forms an image on the sheet material P transported from the accommodating portion 14 by the transport unit 16, a motor that drives a developing device 40 in the image formation unit 30, and a control unit that controls the operation of each unit of the image forming apparatus 10. The illustration of the motor and the control unit is omitted.

Further, the image forming apparatus 10 may be provided with a display operation unit (not shown) such as a touch panel display as an example. The display operation unit is an example of a notification unit for notifying a user of information on the image forming apparatus 10 based on a signal received from the control unit, and also functions as a reception unit for receiving the user's operation.

Accommodating Portion

The accommodating portion 14 has an accommodating member (not shown) that can be pulled out from the housing 12 of the image forming apparatus 10 toward a front side (+D direction in FIG. 1) in an apparatus depth direction, and the sheet material P is loaded on the accommodating member. The sheet material P loaded on the accommodating member is delivered to the image formation unit 30 by the transport unit 16 having a plurality of transport rolls (reference numerals omitted).

Image Formation Unit

The image formation unit 30 is provided with four image forming units 32Y, 32M, 32C, and 32K of yellow (Y), magenta (M), cyan (C), and black (K). In the following description, in a case where it is not necessary to distinguish Y, M, C, and K, Y, M, C, and K may be omitted. Further, the image forming unit 32 of each color can be attached to and detached from the housing 12, respectively.

Further, the image forming unit 32 of each color has a drum-shaped photoreceptor unit 36 that circumferentially moves in a direction of an arrow B in FIG. 1 and a charging member 38 that charges a surface of the photoreceptor unit 36.

Below the photoreceptor unit 36 in FIG. 1, a guide member 60 for guiding the photoreceptor unit 36 to a preset disposition position in a case where the photoreceptor unit 36 is disposed inside the housing 12 is provided. A power supply path body 62 forming a power supply path of a substrate 64 and the photoreceptor unit 36 is provided on an inner side (−D direction in FIG. 1) of the guide member 60 in the apparatus depth direction. A power supply (not shown) is mounted on the substrate 64.

Further, the image forming unit 32 has an exposure device (not shown) that irradiates the charged photoreceptor unit 36 with exposure light, and the developing device 40 that develops an electrostatic latent image formed by irradiating the photoreceptor unit 36 with exposure light and visualizes (develops) the electrostatic latent image as a toner image.

Further, the image formation unit 30 has an endless belt 21 with endless shape that circumferentially moves in a direction of an arrow A in FIG. 1, a tension applying roll 24 around which the endless belt 21 is wound, and a driving roll 28. An auxiliary roll may be provided in the vicinity of the tension applying roll 24. Further, the image formation unit 30 has a primary transfer roll 22 that transfers the toner image formed by the image forming unit 32 of each color to the endless belt 21.

Further, the image formation unit 30 has a secondary transfer roll 23 that transfers the toner image transferred to the endless belt 21 to the sheet material P. A transfer device 20 including the endless belt 21, the tension applying roll 24, the driving roll 28, and the primary transfer roll 22 is configured. Further, the image formation unit 30 has a fixing device 18 for fixing the toner image to the sheet material P by heating and pressurizing the sheet material P to which the toner image is transferred.

Image Forming Operation

Next, the operation of image formation using the image forming apparatus 10 according to the present exemplary embodiment will be described. First, the charging member 38 of each color to which a voltage is applied uniformly negatively charges the surface of the photoreceptor unit 36 of each color at a predetermined potential. Subsequently, the exposure device irradiates the surface of the photoreceptor unit 36 of each color charged based on image data input from an outside with exposure light to form an electrostatic latent image, thereby forming the electrostatic latent image corresponding to the data on the surface of the photoreceptor unit 36 of each color. Further, the developing device 40 of each color develops the electrostatic latent image and visualizes the electrostatic latent image as a toner image.

Further, the toner images formed on the surface of the photoreceptor unit 36 of each color are sequentially transferred to the endless belt 21 that circumferentially moves by the primary transfer roll 22. On the other hand, the sheet material P delivered from the accommodating member 26 to the transport path by the delivery roll is delivered to a transfer position T where the endless belt 21 and the secondary transfer roll 23 are in contact with each other.

At the transfer position T, the sheet material P is transported between the endless belt 21 and the secondary transfer roll 23, such that the toner image on an outer circumferential surface of the endless belt 21 is transferred to the sheet material P. The toner image transferred to the surface of the sheet material P is fixed to the sheet material P by the fixing device 18. Then, the sheet material P on which the toner image is fixed is discharged to an outside of the housing 12.

Next, the housing 12, the photoreceptor unit 36, the guide member 60, the power supply path body 62, and the substrate 64 of the image forming apparatus 10 of the present exemplary embodiment will be described more specifically.

Housing

Figure 2:
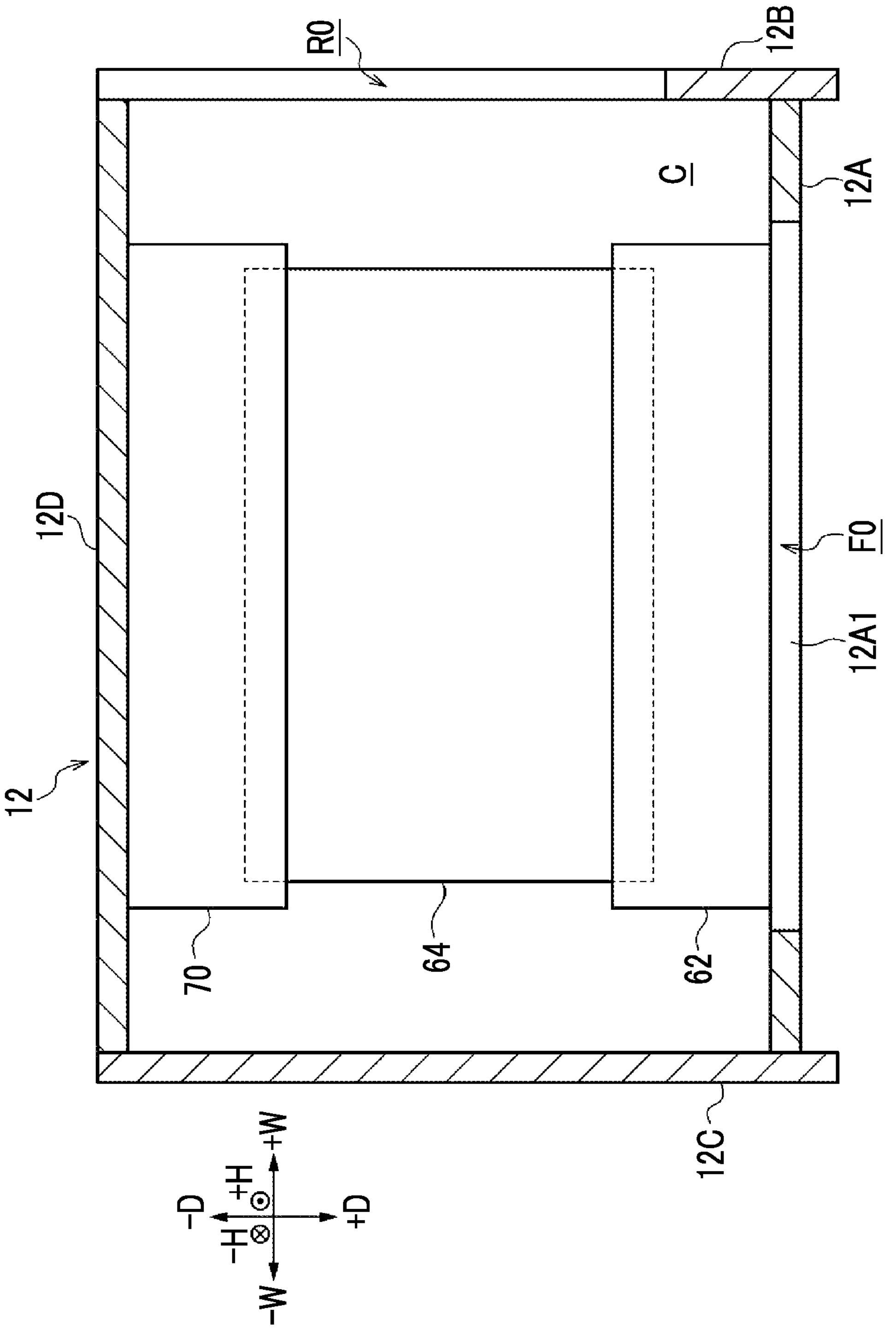
FIG. 2 is a cross sectional diagram of an inside of an image forming apparatus according to the present exemplary embodiment as viewed from above.
Figure 3:
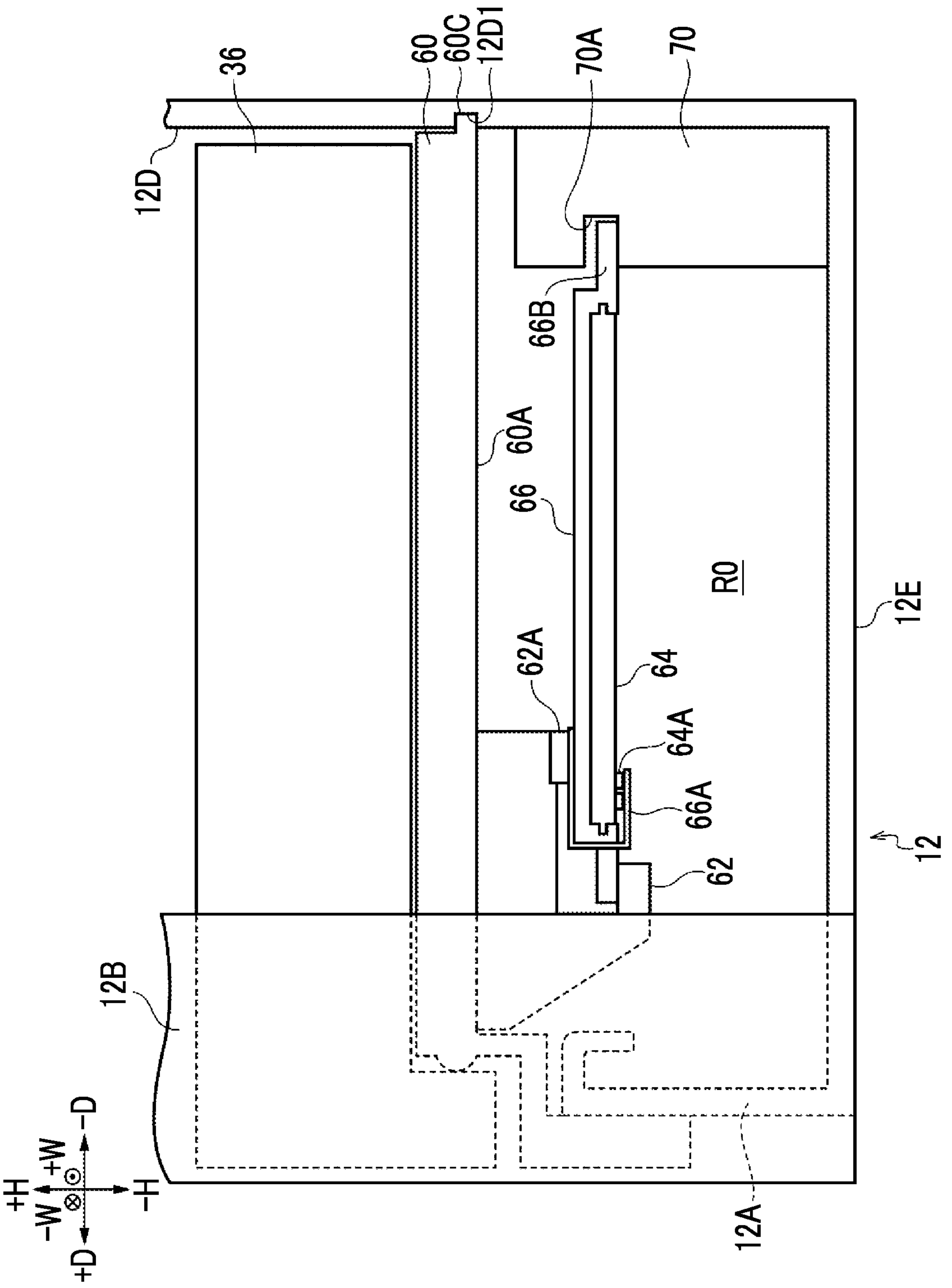
FIG. 3 is a side diagram of an inside of an image forming apparatus according to the present exemplary embodiment as viewed from a right side.

As shown in FIG. 2, the housing 12 has a front surface frame 12A, a right side frame 12B, a left side frame 12C, and a back surface frame 12D. Further, as shown in FIG. 3, the housing 12 has a bottom plate 12E. Further, although the reference numerals are omitted, as shown in FIG. 1, the housing 12 is provided with a top plate. The front surface frame 12A, the right side frame 12B, the left side frame 12C, the back surface frame 12D, the bottom plate 12E, and the top plate form an internal space of the housing 12.

The power supply path body 62 is disposed on the front surface frame 12A side inside the housing 12. Further, a support 70 is disposed on the back surface frame 12D side inside the housing 12. The support 70 is fixed to the back surface frame 12D. The support 70 is, for example, a power supply path body for transfer. Inside the housing 12, the substrate 64 is disposed between the power supply path body 62 and the support 70 in the apparatus depth direction (+D direction and −D direction in FIG. 2).

Front Surface Frame

The front surface frame 12A is a rectangular frame, and is located on the front side (+D direction in FIG. 2) in the apparatus depth direction. The front surface frame 12A has an upper edge 12A1. The upper edge 12A1 of the front surface frame 12A forms a lower edge of a front opening FO.

The front opening FO is formed on a front surface of the housing 12. As shown in FIG. 3, the power supply path body 62 is disposed to face the front surface frame 12A at a height below the front opening FO. The guide member 60 and the power supply path body 62 enter and exit the front opening FO.

Protruding Portion and Curved Portion

Figure 4:
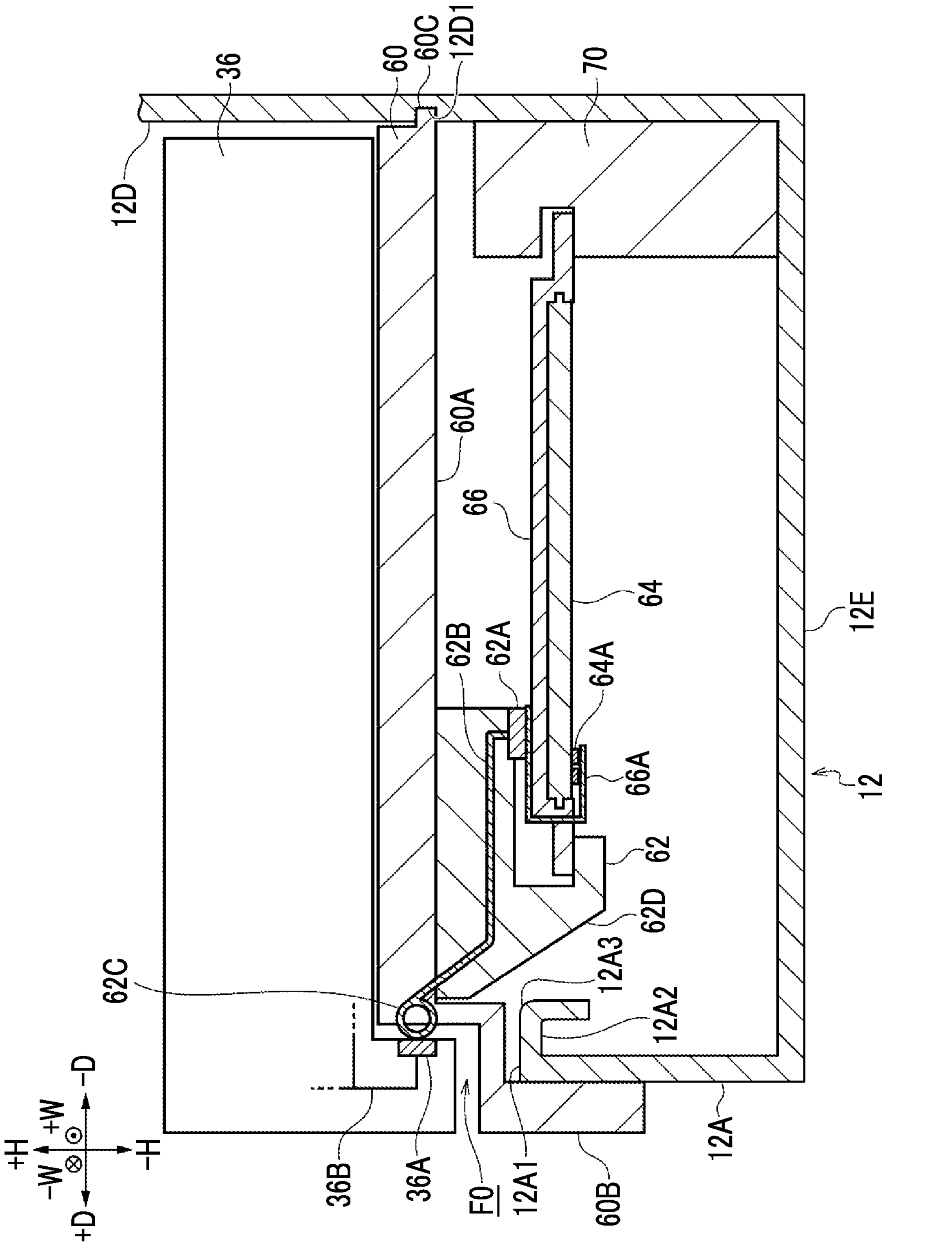
FIG. 4 is a cross sectional diagram of a powered body, an attachable/detachable body, and a power supply path body of an image forming apparatus according to the present exemplary embodiment as viewed from a right side.

As shown in FIG. 4, a protruding portion 12A2 protruding from the front surface frame 12A toward the inside of the housing 12 is provided in an upper portion of an inner wall surface of the front surface frame 12A. A curved portion 12A3 is provided in an upper edge of the protruding portion 12A2 on the power supply path body 62 side. The curved portion 12A3 is a portion facing the power supply path body 62. A surface of the curved portion 12A3 is formed to be curved, for example, by folding back a sheet metal.

Right Side Frame

The right side frame 12B is a rectangular frame, and is provided on a right end side of the front surface frame 12A in a left and right direction as viewed from the front. As shown in FIG. 2, a wall-shaped front surface frame 12A and a wall-shaped right side frame 12B form a corner portion C of the housing 12. As shown in FIG. 3, a side opening RO through which the substrate 64 enters and exits is formed on a side surface of the housing 12 between the right side frame 12B and the back surface frame 12D.

Photoreceptor Unit

The photoreceptor unit 36 is an example of a powered body for image formation. The photoreceptor unit 36 is attachably and detachably provided inside the housing 12. Specifically, for example, the photoreceptor unit 36 is attachably and detachably provided with respect to a drive unit (not shown) attached to the housing 12 on the inner side (−D direction in FIG. 3) in the apparatus depth direction. In the present disclosure, the configuration in which the photoreceptor unit is attachably and detachably attached to the housing 12 is not limited to this, and can be changed.

Guide Member

The guide member 60 has a rectangular shape in a plan view. As shown in FIG. 4, the guide member 60 has a central portion 60A, a hanging portion 60B, and a convex portion 60C. The guide member 60 is an example of an attachable/detachable body.

The central portion 60A is a plate-shaped member and is a main body of the guide member 60. The central portion 60A extends along an apparatus width direction (+W direction and −W direction in FIG. 4) and extends along the apparatus depth direction (+D direction and −D direction in FIG. 4). Further, as shown in FIG. 3, a height of the central portion 60A in a vertical direction is shorter than a length of the central portion 60A in the apparatus depth direction.

In the present disclosure, the shape of the guide member is not limited to this, and can be changed as appropriate. As shown in FIG. 1, the guide member 60 of the present exemplary embodiment guides the photoreceptor unit 36 of four colors on the upper side, but the present disclosure is not limited to this, and the number of colors of the guided photoreceptor unit can be appropriately changed.

As shown in FIG. 4, the hanging portion 60B is provided in an end portion of the central portion 60A on the front side (+D direction in FIG. 4) in the apparatus depth direction. A step is formed between an upper surface of the central portion 60A and an upper surface of the hanging portion 60B in FIG. 4. A portion of the photoreceptor unit 36 is disposed in an area above a stepped portion in the front opening FO. Further, an inner wall surface of the hanging portion 60B is in contact with an outer wall surface of the front surface frame 12A. In the present disclosure, the hanging portion 60B is not required.

As shown in FIG. 4, the convex portion 60C is provided in an end portion of the central portion 60A on the inner side (−D direction in FIG. 4) in the apparatus depth direction. The convex portion 60C protrudes toward the back surface frame 12D. A portion of the back surface frame 12D corresponding to the convex portion 60C is provided with a concave portion 12D1 into which the convex portion 60C can be fitted. The guide member 60 is attachably and detachably provided in the housing 12 by the convex portion 60C and the concave portion 12D1.

In the present disclosure, the attachable/detachable body is not limited to the guide member 60, and the powered body such as the photoreceptor unit 36 can be regarded as the attachable/detachable body. Further, a member that is integral with the powered body and that moves integrally with the powered body in a case where the member is attached to and detached from the housing 12 may be regarded as the attachable/detachable body. In the present disclosure, the attachable/detachable body may be attachably and detachably provided in the housing 12 and integrated with the substrate 64 and the power supply path body 62.

Further, in the present exemplary embodiment, a case where the photoreceptor unit 36 which is an example of the powered body, and the guide member 60 which is an example of the attachable/detachable body are separately configured has been exemplified, but the present disclosure is not limited to this, and the powered body and the attachable/detachable body may be integrally configured. That is, the powered body and the attachable/detachable body may be taken in and out of the housing 12 together.

Further, the guide member 60 of the present exemplary embodiment is made of, for example, a resin. In the present disclosure, a material of the guide member 60 is not limited to the resin, and can be optionally changed to, for example, a metal. However, in a case where the power supply path body 62 is fixed to the housing 12, the housing 12 may be required to have relatively high strength depending on a weight of the power supply path body 62. For example, in a case where it is required to use a metal for a fixing portion between the housing 12 and the power supply path body 62, the weight of the housing 12 is heavy and the cost increases. In the present exemplary embodiment, by providing the guide member 60 made of a resin, the weight of the housing 12 can be reduced and the cost can be reduced.

Power Supply Path Body

As shown in FIG. 2, the power supply path body 62 is disposed inside the corner portion C formed by the front surface frame 12A and the right side frame 12B. In the present exemplary embodiment, "disposed inside the corner portion C" means a state in which the right side frame 12B and the power supply path body 62 overlap as viewed from the side opening RO side along the apparatus width direction (+W direction and −W direction in FIG. 4). In the present exemplary embodiment, the power supply path body 62 is attachably and detachably provided in the guide member 60 by fitting, screwing, or the like.

In the present exemplary embodiment, the power supply path body 62 and the guide member 60 can be integrally separated from the housing 12. It is also possible to separate the power supply path body 62 from the housing 12 by removing only the power supply path body 62 from the guide member 60 while the guide member 60 is mounted on the housing 12. Since only the power supply path body 62 can be separated from the housing 12, for example, even in a case where the shape of the guide member 60 is different between different models, the cost can be suppressed by standardizing the power supply path body 62.

As shown in FIG. 4, the power supply path body 62 includes a contact terminal 62A provided on the substrate 64 side, a conduction wire 62B coupled to the contact terminal 62A, and a contact terminal 62C provided on the photoreceptor unit 36 side. The contact terminal 62A on the substrate 64 side is, for example, a thin metal leaf spring. The contact terminal 62C on the photoreceptor unit 36 side is, for example, a metal ring-shaped member.

With the power supply path body 62 mounted on the guide member 60, an insertion portion (not shown) for passing the contact terminal 62C is formed in a portion of the guide member 60 corresponding to the contact terminal 62C of the conduction wire 62B by a notch, a through-hole, or the like. The contact terminal 62C protrudes toward an outside (left side in FIG. 3) of the guide member 60 through the insertion portion.

Further, with the photoreceptor unit 36, the guide member 60, and the power supply path body 62 mounted on the housing 12, the contact terminal 62C of the conduction wire 62B on the photoreceptor unit 36 side is coupled to a conductive portion 36A of the photoreceptor unit 36. The conductive portion 36A of the photoreceptor unit 36 is coupled to the wiring member 36B disposed inside.

Tapered Portion

As shown in FIG. 4, a tapered portion 62D is provided in a portion of the power supply path body 62 facing the front surface frame 12A. As viewed along the wall surface of the front surface frame 12A, the tapered portion 62D inclines toward the upper side in FIG. 4 from the power supply path body 62 toward the front surface frame 12A.

In the present disclosure, a curved portion protruding toward the front surface frame 12A may be provided in place of the tapered portion 62D such that a stepped portion is not formed in the portion of the power supply path body 62 facing the front surface frame 12A. That is, at least one of the tapered portion 62D or the curved portion may be provided. Further, the tapered portion 62D and the curved portion may be provided in a partially combined state.

Substrate

The substrate 64 supplies power to the photoreceptor unit 36. A terminal 64A for coupling is provided on a lower surface of the substrate 64 in FIG. 3. As shown in FIG. 3, the substrate 64 is attachably and detachably held by a substrate holding cover 66 that holds the substrate 64 by fitting.

In FIG. 3, a concave portion for storing the substrate 64 is provided in the center of the substrate holding cover 66, and flange portions 66B are provided at both ends. The right flange portion 66B of the substrate holding cover 66 on the support 70 side in FIG. 3 protrudes toward the support 70. Further, a portion of the support 70 corresponding to the right flange portion 66B in FIG. 3 is provided with a concave portion 70A into which the flange portion 66B can be fitted.

Further, the left flange portion of the substrate holding cover 66 in FIG. 3 is supported by a lower portion of the power supply path body 62. Although not shown, for example, at a contact position between the left flange portion of the substrate holding cover 66 and the lower portion of the power supply path body 62 in FIG. 3, positioning is possible by providing the flange portion with a convex portion protruding downward and providing a concave portion corresponding to the convex portion in the power supply path body 62.

As shown in FIG. 2, the substrate 64 is disposed behind the power supply path body 62. The substrate 64 can be inserted into the housing 12 through the side opening RO together with the substrate holding cover 66. Further, the substrate 64 can be separated from the guide member 60 or the power supply path body 62 through the side opening RO together with the substrate holding cover 66.

The substrate holding cover 66 is provided with a conduction path member 66A to extend between an upper surface and a lower surface of the substrate holding cover 66 in FIG. 3. The conduction path member 66A is, for example, a thin metal sheet made of a metal. The conduction path member 66A forms a conduction path from the substrate 64 on the lower surface side of the substrate holding cover 66 in FIG. 3 to the upper surface of the substrate holding cover 66. With the substrate 64 held by the substrate holding cover 66, the end portion of the conduction path member 66A on the lower surface side is in contact with the terminal 64A on the lower surface of the substrate 64. Further, with the substrate holding cover 66 and the power supply path body 62 mounted on the housing 12, the end portion of the conduction path member 66A on the upper surface side is in contact with the contact terminal 62A of the power supply path body 62.

In the present disclosure, the substrate holding cover 66 is not required. The substrate may be directly mounted on the guide member 60 or the power supply path body 62. Further, the substrate 64 of the present exemplary embodiment is mounted on the power supply path body 62 via the substrate holding cover 66, but a thickness of the substrate holding cover 66 in the vertical direction (+H direction and −H direction) in FIG. 3 is smaller than a thickness of the power supply path body 62. Further, the substrate holding cover 66 is supported substantially horizontally at the center of the power supply path body 62 in FIG. 3 in the vertical direction.

That is, in the substrate holding cover 66, the power supply path does not extend in the vertical direction (+H direction and −H direction) in FIG. 3. Therefore, in the present exemplary embodiment, even in a case where the substrate 64 is mounted on the power supply path body 62 via the substrate holding cover 66, it can be considered that the substrate 64 is directly mounted on the power supply path body 62.

Insertion/Removal Operation

Next, an insertion/removal operation of the photoreceptor unit 36, an insertion/removal operation of the guide member 60 and the power supply path body 62 in the image forming apparatus 10 according to the present exemplary embodiment will be described with reference to FIGS. 5 and 6.

Figure 5:
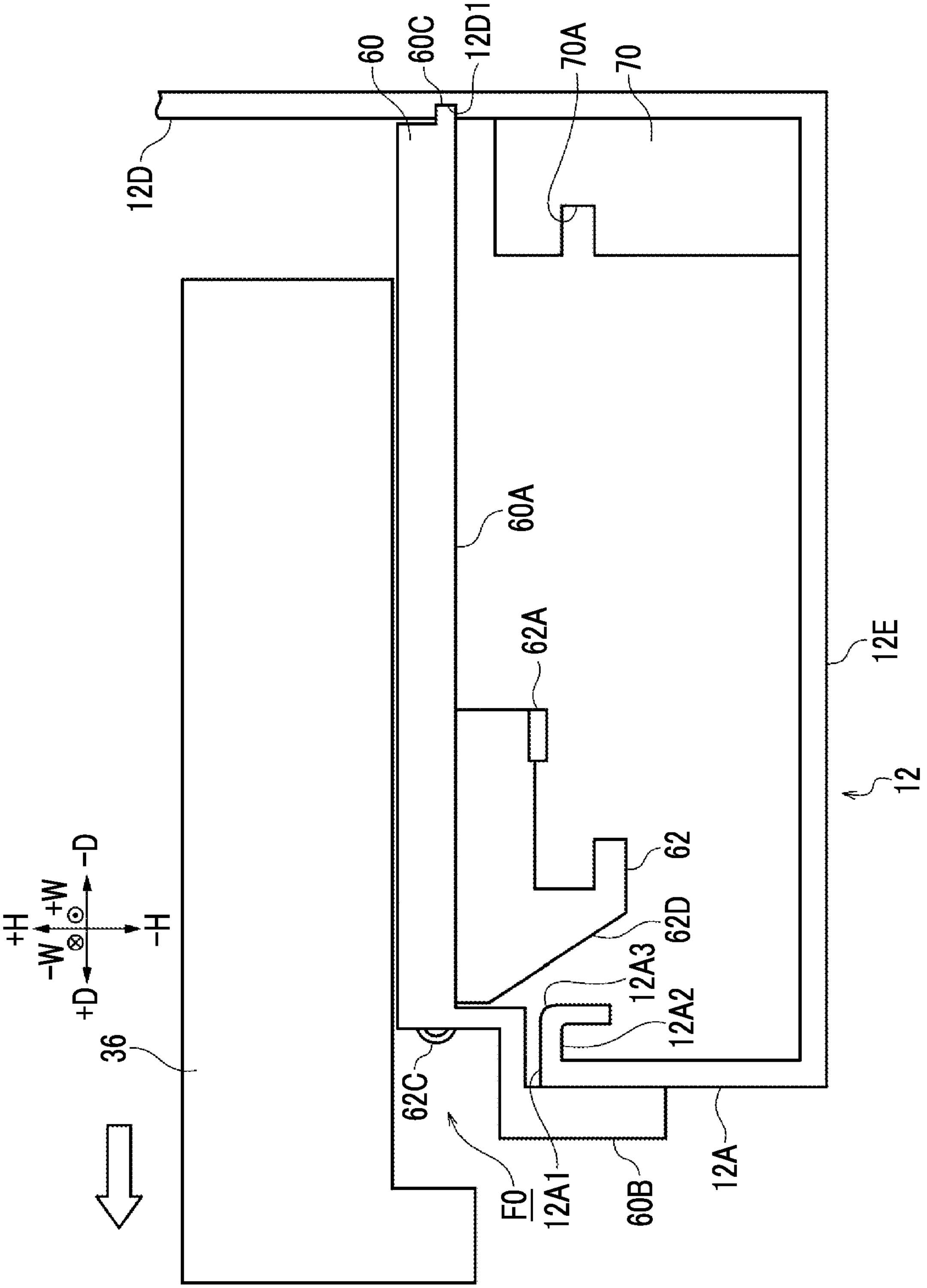
FIG. 5 is a side diagram describing an operation of detaching a powered body of an image forming apparatus from a housing according to the present exemplary embodiment.

As shown in FIG. 5, the photoreceptor unit 36 can be pulled out from the front opening FO of the housing 12. Since the photoreceptor unit 36 is mounted on the housing 12 in a state independent of the substrate 64, a detaching operation of the photoreceptor unit 36 does not affect the substrate 64. Further, an insertion operation of the photoreceptor unit 36 can be performed in a reverse procedure of the detaching operation.

Figure 6:
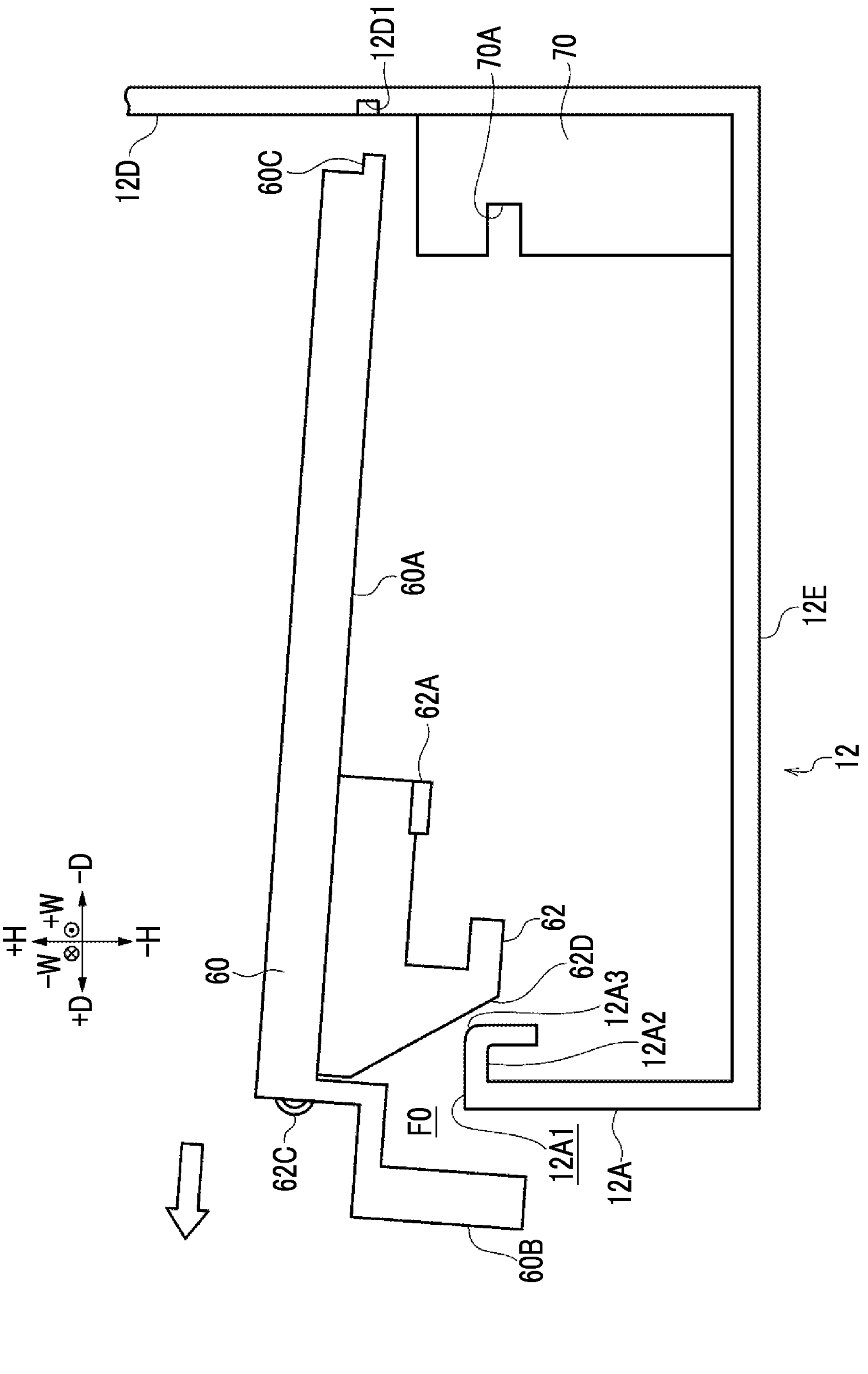
FIG. 6 is a side diagram describing an operation of detaching an attachable/detachable body of an image forming apparatus from a housing according to the present exemplary embodiment.

Further, as shown in FIG. 6, the guide member 60 and the power supply path body 62 can be integrally pulled out from the front opening FO of the housing 12. In a case of the detaching operation of the guide member 60 and the power supply path body 62, the tapered portion 62D of the power supply path body 62 comes into contact with the curved portion 12A3, such that the guide member 60 and the power supply path body 62 can be pulled out to an upper left side in FIG. 6 without the power supply path body 62 being caught by the front surface frame 12A. Further, the insertion operation of the guide member 60 and the power supply path body 62 can be performed in a reverse procedure of the detaching operation.

Action and Effect

In the image forming apparatus 10 of the present exemplary embodiment, the power supply path body 62 is directly coupled to the substrate 64 in a state of being mounted on the guide member 60. That is, three members of the power supply path body 62, the substrate 64, and the guide member 60 are integrated inside the housing 12. Therefore, the housing 12 is downsized as compared with the case where the power supply path body 62, the substrate 64, and the guide member 60 are attachably and detachably provided separately to the housing 12, respectively.

Further, in the image forming apparatus 10 of the present exemplary embodiment, since the guide member 60 is attached to and detached from the housing 12, the power supply path body 62 can be attached to and detached from the housing 12 at the same time in a case where the guide member 60 is attached and detached. Therefore, it is not required to disassemble the housing 12 at the time of maintenance, as compared with a case where the guide member 60 is not attached to or detached from the housing 12. As a result, maintainability of the power supply path body 62 can be improved as compared with the case where the guide member 60 is not attached to and detached from the housing 12.

Further, in the image forming apparatus 10 of the present exemplary embodiment, the attachable/detachable body is the guide member 60 that guides the photoreceptor unit 36 to the disposition position in a case where the photoreceptor unit 36 is disposed inside the housing 12. That is, the guide member 60 also serves as the attachable/detachable body. It is not required to provide a member different from the guide member 60 as the attachable/detachable body. Therefore, the number of members may be reduced.

Further, in the image forming apparatus 10 of the present exemplary embodiment, the front opening FO through which the guide member 60 and the power supply path body 62 enter and exit is formed on the front surface of the housing 12. Therefore, it is easier to attach/detach the power supply path body 62 as compared with the case where the guide member 60 and the power supply path body 62 are attached to and detached from the side surface of the housing 12.

Further, in the image forming apparatus 10 of the present exemplary embodiment, the housing 12 has the wall-shaped front surface frame 12A having the upper edge 12A1 forming the lower edge of the front opening FO. The power supply path body 62 is disposed to face the front surface frame 12A at a height below the front opening FO. Further, in the portion of the power supply path body 62 facing the front surface frame 12A, the tapered portion 62D that inclines upward from the power supply path body 62 toward the front surface frame 12A as viewed along the wall surface of the front surface frame 12A is provided.

In a case where the stepped portion is formed in the portion of the power supply path body 62 facing the front surface frame 12A, in a case where the power supply path body 62 is attached to and detached from the housing 12 via the front opening FO, the upper edge 12A1 of the front surface frame 12A is likely to be caught in the stepped portion of the power supply path body 62. Therefore, as compared with the case where the stepped portion is formed in the portion of the power supply path body 62 facing the front surface frame 12A, in a case where the power supply path body 62 is attached or detached, the upper edge 12A1 of the front surface frame 12A is prevented from being caught by the power supply path body 62.

Further, in the image forming apparatus 10 of the present exemplary embodiment, the tapered portion 62D is provided in the portion of the power supply path body 62 facing the front surface frame 12A. As viewed along the wall surface of the front surface frame 12A, the tapered portion 62D inclines upward from the power supply path body 62 toward the front surface frame 12A. Therefore, in a case where the power supply path body 62 is attached to and detached from the housing 12, the power supply path body 62 may be easily attached and detached as compared with the case where the inner wall surface of the front surface frame 12A is flat.

Further, in the image forming apparatus 10 of the present exemplary embodiment, the protruding portion 12A2 protruding from the front surface frame 12A toward the inside of the housing 12 is provided in an upper portion of an inner wall surface of the front surface frame 12A. Therefore, in a case where the power supply path body 62 is attached to and detached from the housing 12, since the power supply path body 62 may be moved with the contact point between the tapered portion 62D and the protruding portion 12A2 as a fulcrum, the power supply path body 62 may be easily attached and detached as compared with the case where the protruding portion 12A2 is not provided.

Further, in the image forming apparatus 10 of the present exemplary embodiment, the surface of the curved portion

12A3 of the protruding portion 12A2 facing the power supply path body 62 is curved. Therefore, damage to the power supply path body 62 at the time of attachment/detachment is suppressed as compared with the case where the portion of the upper edge 12A1 of the protruding portion 12A2 facing the power supply path body 62 is sharp.

Further, in the image forming apparatus 10 of the present exemplary embodiment, the housing 12 has a wall-shaped side frame provided on one end side of the front surface frame 12A in the left and right direction as viewed from the front. Further, the power supply path body 62 is disposed inside the corner portion C formed by the front surface frame 12A and the side frame. Therefore, the housing 12 may be downsized as compared with the case where the power supply path body 62 projects to the outside of the corner portion C.

Further, in the image forming apparatus 10 of the present exemplary embodiment, the substrate 64 is disposed behind the power supply path body 62, and the side opening RO through which the substrate 64 enters and exits is formed on the side surface of the housing 12. Therefore, the substrate 64 may be attached to and detached from the side surface of the housing 12.

Although the present exemplary embodiment of the present disclosure has been described above with reference to the accompanying drawings, it is clear that anyone with ordinary knowledge in the field of the art to which the present disclosure belongs can come up with various modifications or applications within the scope of the technical ideas described in the claims, and it is understood that these also naturally belong to the technical scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a housing;

a powered body for image formation provided inside the housing;

an attachable/detachable body that is attached to and detached from the housing;

a power supply path body that is attached to and detached from the attachable/detachable body to form a power supply path; and a substrate that supplies power to the powered body, is directly mounted on the attachable/detachable body or the power supply path body, and is separated from the attachable/detachable body or the power supply path body.

2. The image forming apparatus according to claim 1, wherein the attachable/detachable body is a guide member that guides the powered body to a disposition position in a case where the powered body is disposed inside the housing.

3. The image forming apparatus according to claim 1, wherein a front opening through which the attachable/detachable body and the power supply path body enter and exit is formed on a front surface of the housing.

4. The image forming apparatus according to claim 2, wherein a front opening through which the attachable/detachable body and the power supply path body enter and exit is formed on a front surface of the housing.

5. The image forming apparatus according to claim 3, wherein the housing has a wall-shaped front surface frame having an upper edge forming a lower edge of the front opening, the power supply path body is disposed to face the front surface frame at a height below the front opening, and a tapered portion that inclines upward from the power supply path body toward the front surface frame, or a curved portion that protrudes toward the front surface frame, as viewed along a wall surface of the front surface frame is provided at a portion of the power supply path body facing the front surface frame.

6. The image forming apparatus according to claim 4, wherein the housing has a wall-shaped front surface frame having an upper edge forming a lower edge of the front opening, the power supply path body is disposed to face the front surface frame at a height below the front opening, and a tapered portion that inclines upward from the power supply path body toward the front surface frame, or a curved portion that protrudes toward the front surface frame, as viewed along a wall surface of the front surface frame is provided at a portion of the power supply path body facing the front surface frame.

7. The image forming apparatus according to claim 5, wherein a protruding portion that protrudes from the front surface frame toward the inside of the housing is provided in an upper portion of an inner wall surface of the front surface frame.

8. The image forming apparatus according to claim 6, wherein a protruding portion that protrudes from the front surface frame toward the inside of the housing is provided in an upper portion of an inner wall surface of the front surface frame.

9. The image forming apparatus according to claim 7, wherein a portion of an upper edge of the protruding portion facing the power supply path body is curved.

10. The image forming apparatus according to claim 8, wherein a portion of an upper edge of the protruding portion facing the power supply path body is curved.

11. The image forming apparatus according to claim 5, wherein the housing has wall-shaped side frames provided on one end side of the front surface frame in a left and right direction as viewed from a front, and the power supply path body is disposed inside a corner portion formed by the front surface frame and a side frame.

12. The image forming apparatus according to claim 6, wherein the housing has wall-shaped side frames provided on one end side of the front surface frame in a left and right direction as viewed from a front, and the power supply path body is disposed inside a corner portion formed by the front surface frame and a side frame.

13. The image forming apparatus according to claim 7, wherein the housing has wall-shaped side frames provided on one end side of the front surface frame in a left and right direction as viewed from a front, and the power supply path body is disposed inside a corner portion formed by the front surface frame and a side frame.

14. The image forming apparatus according to claim 8, wherein the housing has wall-shaped side frames provided on one end side of the front surface frame in a left and right direction as viewed from a front, and the power supply path body is disposed inside a corner portion formed by the front surface frame and a side frame.

15. The image forming apparatus according to claim 9, wherein the housing has wall-shaped side frames provided on one end side of the front surface frame in a left and right direction as viewed from a front, and the power supply path body is disposed inside a corner portion formed by the front surface frame and a side frame.

16. The image forming apparatus according to claim 10, wherein the housing has wall-shaped side frames provided on one end side of the front surface frame in a left and right direction as viewed from a front, and the power supply path body is disposed inside a corner portion formed by the front surface frame and a side frame.

17. The image forming apparatus according to claim 11, wherein the substrate is disposed behind the power supply path body, and a side opening through which the substrate enters and exits is formed on a side surface of the housing.

18. The image forming apparatus according to claim 12, wherein the substrate is disposed behind the power supply path body, and a side opening through which the substrate enters and exits is formed on a side surface of the housing.

19. The image forming apparatus according to claim 13, wherein the substrate is disposed behind the power supply path body, and a side opening through which the substrate enters and exits is formed on a side surface of the housing.

20. The image forming apparatus according to claim 14, wherein the substrate is disposed behind the power supply path body, and a side opening through which the substrate enters and exits is formed on a side surface of the housing.

* * * * *